United States Patent [19]

Russell

[11] 4,308,119
[45] Dec. 29, 1981

[54] ABRASION-RESISTANT OPTICAL COATING COMPOSITION CONTAINING PENTAERYTHRITOL BASED POLYACRYLATES AND CELLULOSE ESTERS

[75] Inventor: Raymond J. Russell, Lincoln Park, N.J.

[73] Assignee: Panelgraphic Corporation, West Caldwell, N.J.

[21] Appl. No.: 104,351

[22] Filed: Jan. 7, 1980

Related U.S. Application Data

[63] Continuation-in-part of Ser. No. 13,418, Feb. 21, 1979, abandoned.

[51] Int. Cl.$^3$ .......................... C08F 2/50; C08L 1/10; C08L 1/14; C08L 47/00
[52] U.S. Cl. .......................... 204/159.12; 204/159.23; 260/17 A
[58] Field of Search ..................... 204/159.12

[56] References Cited

U.S. PATENT DOCUMENTS

| | | | |
|---|---|---|---|
| 1,552,795 | 9/1925 | Clarke | 106/180 |
| 2,288,352 | 6/1942 | Henderson | 95/73 |
| 2,505,067 | 4/1950 | Sachs et al. | 204/162 |
| 2,927,022 | 3/1960 | Martin et al. | 96/35 |
| 2,993,789 | 7/1961 | Crawford | 96/35 |
| 3,046,127 | 7/1962 | Barney et al. | 96/35 |
| 3,047,422 | 7/1962 | Sites et al. | 117/93 |
| 3,076,723 | 2/1963 | Covington | 117/93.31 |
| 3,149,975 | 9/1964 | Notley et al. | 96/115 |
| 3,164,539 | 1/1965 | Smith | 204/156 |
| 3,203,802 | 8/1965 | Burg | 96/87 |
| 3,278,304 | 10/1966 | Conix et al. | 96/35.1 |
| 3,380,831 | 4/1968 | Cohen et al. | 96/115 |
| 3,551,235 | 12/1970 | Bassemir et al. | 156/99 |
| 3,551,236 | 12/1970 | Bassemir et al. | 156/272 |
| 3,551,311 | 12/1970 | Nass et al. | 204/159.18 |
| 3,556,791 | 1/1971 | Suzuki et al. | 96/35.1 |
| 3,567,494 | 3/1971 | Fitko | 117/93.31 |
| 3,661,614 | 5/1972 | Bassemir et al. | 204/159.23 |
| 3,726,709 | 4/1973 | Garrett et al. | 117/93.31 |
| 3,826,014 | 7/1974 | Helding | 432/42 |
| 3,874,906 | 4/1975 | Prucnal | 204/159.16 |
| 3,903,322 | 9/1975 | Ravve et al. | 427/54 |
| 3,914,594 | 10/1975 | Helding | 240/41.35 |
| 3,974,303 | 8/1976 | Iwase et al. | 427/27 |
| 3,988,228 | 10/1976 | Newland et al. | 204/159.23 |
| 3,992,276 | 11/1976 | Powanda et al. | 204/159.16 |
| 3,998,712 | 12/1976 | Hickmann et al. | 204/159.15 |
| 4,005,244 | 1/1977 | Wismer et al. | 204/159.15 |
| 4,012,302 | 3/1977 | Wang et al. | 204/159.12 |
| 4,016,334 | 4/1977 | Collins et al. | 428/463 |
| 4,024,297 | 5/1977 | Gruber | 204/159.23 |
| 4,042,749 | 8/1977 | Sandvig | 428/412 |
| 4,045,416 | 8/1977 | Robson et al. | 204/159.23 |
| 4,065,368 | 12/1977 | Holtzman | 204/159.23 |
| 4,066,582 | 1/1978 | Babian et al. | 204/159.12 |
| 4,067,791 | 1/1978 | Konno et al. | 204/159.15 |
| 4,070,499 | 1/1978 | Ramler et al. | 427/54 |
| 4,073,967 | 2/1978 | Sandvig | 427/44 |
| 4,084,021 | 4/1978 | Sandvig | 427/44 |
| 4,086,373 | 4/1978 | Tobias | 427/44 |
| 4,091,050 | 5/1978 | McDonald | 204/159.16 |
| 4,097,350 | 6/1978 | Pastor et al. | 204/159.23 |
| 4,099,837 | 7/1978 | Vazirani | 427/162 |
| 4,113,893 | 9/1978 | Hahn | 427/44 |
| 4,116,788 | 9/1978 | Schmitt et al. | 204/159.23 |
| 4,134,809 | 1/1979 | Pacifici et al. | 204/159.12 |
| 4,147,603 | 4/1979 | Pacifici et al. | 204/159.12 |
| 4,194,955 | 3/1980 | Nowak | 204/159.11 |

OTHER PUBLICATIONS

Chem. Abstracts vol. 84, 1976 #32769h.
Chem. Abstracts vol. 84, 1976 #32764c.
Chem. Abstracts vol. 90, 1979 #24897g.
Chem. Abstracts vol. 89, 1978 #148289j.
Chem. Abstracts vol. 88, 1978 #138049w.
Chem. Abstracts vol. 88, 1978 #8657g.
Chem. Abstracts vol. 89, 1978 #216936v.
Chem. Abstracts vol. 85, #6864m.

*Primary Examiner*—John C. Bleutge
*Assistant Examiner*—A. H. Koeckert
*Attorney, Agent, or Firm*—Ronald G. Goebel

[57] ABSTRACT

Actinic radiation curable coating compositions are provided applicable to many substrates comprising a pentaerythritol-based polyacrylate or polymethacrylate such as pentaerythritol tetraacrylate, a cellulose ester such as cellulose acetate butyrate and a photoinitiator. The compounds are preferably applied to the substrate by spraying a solution of the composition in one or more solvents selected from the group consisting of lower alcohols and ester, ketones having from 3 to 7 carbon atoms and lower alkyl Cellosolves, and removing the solvents.

Upon curing in air the compositions form extremely abrasion resistant coatings on the substrate and are also characterized by being scratch resistant and resistant to attack by chemical and organic solvents.

43 Claims, No Drawings

ABRASION-RESISTANT OPTICAL COATING COMPOSITION CONTAINING PENTAERYTHRITOL BASED POLYACRYLATES AND CELLULOSE ESTERS

BACKGROUND OF THE NVENTION

This application is a continuation in part of U.S. application Ser. No. 013,418, filed Feb. 21, 1979, now abandoned.

This invention relates to radiation curable coating compositions which when cured form highly abrasion resistant coatings for most any substrate.

In the past, many curable or crosslinkable compositions have been developed in the art for use as coatings for clear plastics and the like which when cured offer varying degrees of abrasion and solvent resistance. Among such compositions are fluorocarbon-vinyl ether copolymers crosslinked with polysilicic acid, melamine-formaldehyde coatings, polyurethanes, polysiloxanes, polyalkyls, polyallyldicarbonates, and polyfunctional acrylics. Such coatings have been applied to a wide variety of polymeric substrates including acrylic sheeting, polycarbonates, polyesters and the like. These compositions are generally applied to the substrate by any known method such as dipping, brushing or spraying and are cured at either high temperature or at low temperature in the presence of a catalyst. Ultraviolet curable coatings based on unsaturated polyester resins, including polyacrylics, and containing a photoinitiator have also been described in the art.

The present invention deals with radiation curable coating compositions containing a specific class of polyacrylates and cellulose esters which can be applied to a variety of substrates. The precured coatings are dust-free, level out extremely well on the substrates and are stable against air inhibition of cure such that they can be cured in air hours after application to the substrate. On curing, coatings are formed exhibiting extremely high abrasion resistance, flexibility, weatherability and resistance to thermal stress cracking. Such coatings are additionally scratch resistant and are not attacked by chemical or organic solvents.

SUMMARY OF THE INVENTION

In one embodiment of the present invention a coating composition curable by actinic radiation is provided which can be applied to most any substrate and when cured forms an extremely abrasion-resistant coating on the substrate.

The curable composition comprises a pentaerythritol-based polyacrylate or polymethacrylate, a cellulose ester and a photoinitiator which can be applied to the substrate by any means known in the art such as by brushing, dipping, spraying or by roller, gravure, spin or flow coating techniques. Spraying is particularly preferred. Solvents such as lower alcohols, lower acetates, ketones and ethyleneglycol alkyl ethers may also be added to the composition to facilitate mixing of the components and to allow efficient and uniform application of the composition to the substrate.

In another embodiment of this invention a method of forming an abrasion resistant coating on a substrate is provided comprising applying the above composition to the substrate to form a coating, removing any solvents from the composition by evaporation and exposing the coating to ultraviolet radiation to effect curing thereof. Post-curing of the coating at elevated temperatures may be conducted to further enhance abrasion resistance.

In other embodiments of the invention a composition comprising the cured product of the above curable composition and a substrate having a coating of the curable composition and the cured product of the curable composition are also provided.

DETAILED DESCRIPTION OF THE PREFERRED EMBODIMENTS

The pentaerythritol-based polyacrylates and polymethacrylates of the curable compositions of this invention include polyacrylates and polymethacrylates of pentaerythritol such as the tri- and tetra-acrylates and methacrylates of pentaerythritol, polyacrylates and methacrylates of di- and tri-pentaerythritols such as dipentaerythritol penta- and hexa-acrylate and dipentaerythritol penta- and hexa-methacrylate and tripentaerythritol octa-acrylate and methacrylate as well as mixtures of the above polyacrylates and polymethacrylates. Pentaerythritol tetraacrylate is particularly preferred due to its high performance in imparting abrasion resistance to the final, cured composition.

The cellulose esters of this invention comprise the reaction product of cellulose with at least one organic carboxylic acid having from about 2 to 4 carbon atoms or nitric acid. The preferred cellulose esters are cellulose acetate butyrates containing on the average from about 15% to 50% butyrl groups, from about 1% to 30% acetyl groups and from about 1% to 5% hydroxyl groups and preferably having a viscosity in Poises of from about 50 to 200 at 25° C. in a solution comprising 20 wt. % cellulose ester, 72 wt. % acetone and 8 wt. % ethyl alcohol. Particularly preferred is a cellulose acetate butyrate containing on the average 37% butyryl groups, 13% acetyl groups and 2% hydroxyl groups and having a viscosity in Poises of from about 64 to 124 at 25° C. in the above described solution. Nitrocellulose may also be employed as the cellulose ester.

A photoinitiator is added to the composition to initiate crosslinking or curing upon irradiation. Such photoinitiators are well known in the art and include such compounds as benzoin, benzoin methylether, diphenyl disulfide, dibenzyl disulfide, benzil, benzophenone, xanthane, acetophenone, anthraquinone, Michler's ketone and the like. A preferred photoinitiator is alpha-chloroacetyldiphenyloxide. An accelerator such as a tertiary amine may also be added.

It has also been found that small amounts of a peroxide such as benzoyl peroxide may act as a photoinitiator by initiating crosslinking or curing of the compositions. Such peroxide has the added advantage that it can be used in smaller amounts than the photoinitiators described above and does not tend to discolor or yellow the cured coatings. A combination of photoinitiators may be employed in some cases.

The compositions of the present invention may be applied to the substrate in any conventional manner such as spraying, dipping, brushing or by roller, gravure, spin or flow coating techniques. Spraying is preferred since it allows uniform application of thin cured coatings to the substrate, i.e. on the order of 0.1 to 1.5 mils.

In order to facilitate mixing of the elements of the composition and to allow for efficient spraying, one or more solvents may be employed in the composition, which include lower alcohols having from 1 to 4 carbon atoms such as propanol and butanol, lower alkyl acetates having from 4 to 6 carbon atoms such as propyl and butyl acetate; alkyl ketones having from 3 to 7 carbon atoms such as methyl isoamyl ketone; and ethylene glycol lower alkyl ethers (Cellosolves) such as methyl and ethyl Cellosolve. Organic solvents other than those named above may also be employed provided they are good solvents for the pentaerythritol-based polyacrylate or polymethacrylate and cellulose ester and do not attack the substrate on which the composition is coated. For example, a quantity of an aromatic solvent such as xylol may also be employed with the above-described solvents to dissolve certain pentaerythritol-based polymethacrylates such as pentaerythritol tetramethacrylate.

The composition may also contain small amounts of flatting agents to lower the gloss of the coating and silicones to increase the flowability of the compositions.

The substrates which can be coated with the curable compositions of this invention are numerous and include any material to which the composition will adhere and coat such as wood, glass, metal, rubber and plastics. The compositions are particularly useful for coating polymeric substrates such as polycarbonates, polyvinyls including rigid polyvinyl chloride sheet substrate and substrates comprised of copolymers of polyvinyl chloride and polyvinylacetate, polyacrylics and polyesters. The compositions may be used for the coating of vinyl and polycarbonate substrates used to manufacture low reflection filters for cathode ray tubes (C.R.T.'s) and for acrylic substrates used as front panels for electronic equipment.

Upon curing in air by actinic radiation, the present compositions form a highly abrasion resistant coating even on contoured surfaces which have a lower point of contact with abrasive objects moved along its surface. Tests conducted on cured compositions of this invention coated on polymeric substrates have proved their extremely high resistance to steel wool abrasion and Taber Abrasion. The compositions are also resistant to scratching as shown by tests with a weighed stylus according to the BTL Balanced Beam Mar Test (ASTM Method D-2197). The cured compositions of this invention are also characterized by their high resistance to organic solvents, acids and bases, to thermal stress cracking and are flexible and weatherable. Moreover, clear, cured coatings containing flatting agents made according to the invention are also characterized by their low gloss and high resolution making them ideally suitable for low reflection filters for C.R.T.'s. Clear coatings of this invention may also be applied to clear plastic lenses, meter faces, formed plastic windshields and flat plastic windows used for optical applications to provide abrasion and scratch resistance.

The curable compositions of this invention are prepared by first forming a heavy solution of the cellulose ester in one or more solvents, i.e. about 10 to 15% of cellulose ester by weight. A portion of this solution and the pentaerythritol-based polyacrylate or methacrylate is added to a further solvent system to provide a coating composition which, if applied separately to a substrate and dried, would form a slightly tacky but dust free coating on the substrate. For example such a coating composition can be formed using pentaerythritol tetraacrylate and cellulose acetate butyrate by adding a portion of a heavy solution of cellulose acetate butyrate in propyl acetate and propanol and pentaerythritol tetraacrylate to a further solvent system comprising propyl acetate, propyl alcohol and methyl Cellosolve to form a solution containing the following weight percentages of each component:

| pentaerythritol tetraacrylate | 30 wt. % |
| --- | --- |
| cellulose acetate butyrate | 3 wt. % |
| propyl acetate | 34 wt. % |
| propyl alcohol | 28 wt. % |
| methyl cellosolve | 5 wt. % |
| | 100 wt. % |

This composition provides a weight ratio of pentaerythritol tetraacrylate to cellulose acetate butyrate of about 10 to 1. In the case of pentaerythritol-based polymethacrylates such as pentaerythritol tetramethacrylate, an aromatic solvent such as xylol may also be employed in forming the coating composition.

The weight ratio of pentaerythritol-based polyacrylate or methacrylate to cellulose ester is an important factor in determining the abrasion resistance of the finally cured coatings. Coatings containing too low a ratio of pentaerythritol-based polyacrylate or methacrylate to cellulose ester i.e., excessive cellulose ester, tend to lose abrasion resistance in the cured state because of the lack of sufficient amounts of crosslinked polyacrylate or methacrylate. Coatings containing too high a ratio, i.e. insufficient cellulose ester, tend to lose abrasion resistance in the cured state because of the non-uniform or irregular distribution of the polyacrylate or methacrylate and the inability of the cellulose ester to prevent air inhibition of the polyacrylate or methacrylate cure which will be discussed further below. Coatings containing no cellulose ester for example, are not appreciably abrasion resistant, especially as thin films. Therefore there exists a set of ratio ranges for each type of polyacrylate or polymethacrylate and cellulose ester above and below which abrasion resistance in the finally cured coatings may decrease significantly or completely.

In the case of compositions containing pentaerythritol-based polyacrylates or methacrylates and the preferred cellulose acetate butyrates, this ratio should be between about 6 to 1 and about 100 to 1 to achieve abrasion resistance in the cured coatings. High abrasion resistance is achieved at ratios of from about 8 to 1 to about 20 to 1 and optimum abrasion resistance is achieved using a ratio of about 10 to 1. At ratios greater than about 20 to 1 thermal stress cracking begins to occur in the cured composition if the temperature is elevated during curing. This also depends on the type of substrate coated and the film thickness of the coating. Below ratios of about 5 to 1 and above ratios of about 100 to 1, abrasion resistance decreases significantly. Although it is important that the ratio of pentaerythritol-based polyacrylate or methacrylate to cellulose ester be maintained in the above ranges, the solvent compositions and amounts may be altered to provide pre-cured coatings or varying consistency as required or desired by those skilled in the art.

Next, a clear sprayable solution is prepared by dissolving a portion of the above coating composition in one or more solvents which are mutually compatible and which will not attack the substrate onto which the composition is to be applied. It has been found that a sprayable solution comprising about 50% by weight of the above coating composition in equal parts by weight of butyl acetate, butanol, methyl isoamyl ketone, and methyl Cellosolve is useful and has the advantage that such a mixture will not attack most polymeric substrates including polycarbonate substrates. However, such solvents may be varied by those skilled in the art depending on the substrate or the method of application. To this solution is added the photoinitiator in a ratio of about 1 p.b.w. of photoinitiator to 150 p.b.w. of sprayable solution. The amount of photoinitiator based on the amount of pentaerythritol tetraacrylate in the solution is from about 2 to 5 weight percent but may be varied by those skilled in the art. If a peroxide such as benzoyl peroxide is employed as a photoinitiator the amount used is generally about 1 weight percent.

The sprayable solution is then preferably sprayed on the substrate using a conventional low pressure spray gun at a wet film thickness of from about 0.9 to 3.0 mils. Thereafter, the solvents are allowed to evaporate either at room temperature for about 10 minutes or at 100° F. to 120° F. for about 2 minutes. Coatings so applied level out well on the substrate, that is form a smooth contiguous film. The dry coating is essentially non-tacky and dust-free. Finally, the dry coating is exposed to actinic radiation to provide a cured coating of from about 0.1 to about 1.5 mil. in dry film thickness.

Actinic radiation as used herein is electromagnetic radiation having a wavelength of 700 nanometers or less which is capable of producing, either directly or indirectly, free radicals in the photoinitiator which in turn cause cross-linking addition polymerization of the compositions. The most commonly used form of actinic light and the preferred form herein is ultraviolet light, that is, electromagnetic radiation having a wavelength in the range of from about 180 nanometers to about 460 nanometers, although actinic light of greater or shorter wavelengths may also be used. Generally, exposures of from about 1 to 5 sec. are sufficient to effect curing of pentaerythritol-based polyacrylate compositions while somewhat longer exposure times are required for the pentaerythritol-based polymethacrylate compositions.

Any suitable source which emits ultraviolet light may be used in curing the compositions of this invention. Particularly preferred are ultraviolet emitting lamps of the medium mercury vapor type having a power rating of 200 watts/inch.

It has been found that the use of cellulose acetate butyrate as the cellulose ester, particularly the preferred cellulose acetate butyrates described above, solve many problems associated with coating substrates with thin films, ie. on the order of 2 to 20 microns, of compositions comprised of radiation curable pentaerythritol-based polyacrylates or methacrylates. Pentaerythritol-based polyacrylates such as pentaerythritol tetraacrylate are low viscosity liquids which when deposited on a substrate do not form uniform coatings, nor do they level out well on the substrate. Pentaerythritolbased polymethacrylates such as pentaerythritol tetramethacrylate are soft, tacky solids and tend to crystallize when coated in solution on the substrate after solvent removal. Moreover, coatings of pentaerythritol-based polyacrylates are wet, tacky and dust attractive. It is also necessary to cure pentaerythritol-based polyacrylate or methacrylate films in an inert atmosphere since the presence of air inhibits their cure. The exclusion of air to enable curing of the polyacrylates or methacrylates is impractical for most commercial coating applications and costly as well. Cured coatings of such polyacrylates are characterized by being brittle, inflexible and subject to cracking in response to heat or stress.

The use of a cellulose ester such as the cellulose acetate butyrates described above increases the viscosity of the pentaerythritol-based polyacrylate thereby allowing the coating to be uniformly deposited and to level out well on the substrate. Cellulose acetate butyrate inhibits crystallization of the above pentaerythritol-based polymethacrylates. Secondly, thin films on the order of 2 to 20 microns containing the ester can be deposited on the substrate and dry quickly to a substantially dust free coating. Thirdly, and probably most importantly, is the ability of the cellulose ester to substantially eliminate the air inhibition of the polyacrylate or methacrylate cure. Fourthly, cured films containing the cellulose ester are characterized by being thermal stress crack resistant, flexible, and resistant to weathering.

Thus, compositions according to the present invention can be applied as thin films which readily flow and level out on the substrate, dry rapidly to a dust-free and stable condition such that the films can be cured either immediately or hours later in a few seconds without concern for the elimination of air at any time and form flexible, thermal stress crack-resistant, weatherable, and highly abrasion resistant coatings.

It has also been found that by post-curing the irradiated coating at temperatures of from about 100° F. to 200° F. at from 2 to 5 hrs., abrasion resistance is even further enhanced.

In order to more completely describe the present invention, the following Examples are given:

EXAMPLE 1

This example illustrates the preparation, application to a substrate and curing of the preferred composition of this invention. The cellulose acetate butyrate employed in this Example had on the average 37% butyryl groups, 13% acetyl groups and 2% hydroxyl groups and a viscosity in Poises of between about 64 and 124 at 25° C. in a solution comprising 20 wt. % cellulose acetate butyrate, 72 wt. % acetone and 8 wt. % ethyl alcohol.

A stock solution containing 14.3 wt. % of cellulose acetate butyrate in propyl acetate and propanol was first prepared by dissolving 50 parts by weight (p.b.w.) of the cellulose acetate butyrate in a solvent mixture of 200 p.b.w. of propyl acetate and 100 p.b.w. of propanol.

A coating formulation was prepared by dissolving a portion of the so-formed stock solution and pentaerythritol tetraacrylate in a further solvent system as shown below.

| Additive | p.b.w. |
|---|---|
| Stock Solution | 126 |
| Pentaerythritol Tetraacrylate | 180 |
| Solvents | |
| Propyl acetate | 132 |
| Propanol | 132 |
| Methyl Cellosolve | 30 |
| | 600 |

This coating formulation contained the following total weight percentages of each component.

| Component | Total wt. % |
|---|---|
| Pentaerythritol Tetraacrylate | 30 |
| Cellulose Acetate Butyrate | 3 |

-continued

| Component | Total wt. % |
|---|---|
| Propyl Acetate | 34 |
| Propyl Alcohol | 28 |
| Methyl Cellosolve | 5 |
| Total | 100 |

Such a coating formulation, if separately applied to a substrate and dried to remove solvents, leaves a slightly tacky and dust free film on the substrate.

Next, a sprayable, clear solution was formed by adding a portion of the above coating formulation to a spray-able solvent system as set forth below.

| Additive | p.b.w. |
|---|---|
| Coating Formulation | 356 |
| Solvents | |
| Butyl Acetate | 100 |
| Butanol | 100 |
| Methyl Isoamyl Ketone | 100 |
| Methyl Cellosolve | 100 |
| | 756 |

This sprayable solution contained the following total weight percentages of each component.

| Component | Total wt. % |
|---|---|
| Pentaerythritol Tetraacrylate | 14.2 |
| Cellulose Acetate Butyrate | 1.4 |
| Propyl Acetate | 16.0 |
| Propyl Alcohol | 13.2 |
| Methyl Cellosolve | 15.6 |
| Butanol | 13.2 |
| Butyl Acetate | 13.2 |
| Methyl Isoamyl Ketone | 13.2 |
| | 100.0 |

To this solution was added 0.8 p.b.w. of alpha chloroacetyldiphenyloxide to form a UV curable coating composition. This curable composition was then sprayed under low pressure on a polyvinyl chloride substrate (TENNECO CHEM. CO.) at a wet film thickness of about 0.9 mil using a DeVilbiss TYPE EGA spray gun and allowed to dry in air at room temperature. The composition leveled out well on the substrate. Upon drying the film thickness was about 0.3 mil. and was dust-free. The polyvinylchloride substrate coated with the curable mixture was then irradiated with high intensity UV light for about 3 sec. to effect curing. It was found that the curable composition could be left on the substrate for hours before UV curing without air inhibition of cure.

EXAMPLE 2

This Example demonstrates the resistance to steel wool abrasion of a cured composition according to this invention on a polymeric substrate and its comparison to other coated substrates and an uncoated substrate.

In this Example, a sample of the cured composition of Example 1 on polyvinyl chloride (Ex. 1 COATING) was subjected to abrasion by rubbing with a ½ inch block of aluminum covered with ⅛ inch thick 0000 steel wool under a 1000 gm. load. After each double rub (1 back and forth stroke) the coating was observed for visible scratches. No more than 1000 double rubs were made. As comparison samples, the following were also tested:

A polyvinyl substrate coated with a vinyl urethane composition (VINYL URETHANE);

A vinyl substrate coated with a composition comprising a vinyl chloride-vinyl acetate-vinyl alcohol terpolymer and melamine (VINYL MELAMINE);

An acrylic substrate coated with a nitrocellulosealiphatic urethane coating (ALIPHATIC URETHANE); and An uncoated polyvinyl chloride substrate (UNCOATED SUBSTRATE).

Table 1 below summarized the results of all test.

TABLE 1

| Sample | No. of Double Rubs | Visible Scratches |
|---|---|---|
| Ex. 1 COATING | 1000 | None |
| VINYL URETHANE | 2 | Numerous |
| VINYL MELAMINE | 2 | Numerous |
| ALIPHATIC URETHANE | 3 | Numerous |
| UNCOATED SUBSTRATE | 1 | Numerous |

As the table shows, the Example 1 COATING resisted scratching by the steel wool up to 1000 double rubs. The remaining samples did not endure more than 3 double rubs before severe scratching developed. In addition, the Example 1 COATING was resistant to thermal stress cracking and flexible.

EXAMPLE 3

In this Example, the samples of Example 2 were tested on a Taber Abrader described in ASTM D 1004-56. To summarize this procedure, each sample was mounted on a turntable and was abraded by a pair of abrasive wheels (CS 10) weighing 1000 g each rotating in opposite directions. The abrasive wheels traveled on the sample about a horizontal axis displaced tangentially from the axis of rotation of the sample resulting in a wearing action. The abrasion was determined by the visual condition of each sample after 50, 100 and 200 revolutions of the Abrader. The weight loss of each sample was also determined after the test. Table 2 summarizes the results.

TABLE 2

| SAMPLE | SAMPLE CONDITION AFTER REVOLUTIONS | | | WEIGHT LOSS |
|---|---|---|---|---|
| | 50 | 100 | 200 | |
| Ex. 1 COATING | No Effect | No Effect | Slight Polish | None |
| VINYL URETHANE | Abraded | — | — | 2 mg. |
| VINYL MELAMINE | Abraded | — | — | 2 mg. |
| ALIPHATIC URETHANE | Abraded | — | — | 3 mg. |
| UNCOATED SUBSTRATE | Abraded | — | — | 3 mg. |

As table 2 shows, hardly any abrasion of the Ex. 1 COATING occurred even after 200 revolutions. The remaining samples, on the other hand, were all abraded after 50 revolutions as indicated by their visible condition and weight loss.

EXAMPLE 4

This Example illustrates the high resistance to scratching of cured coatings according to the present invention on various polymeric substrates.

A sample of the curable coating composition as set forth in Example 1 was sprayed on an acrylic sheet substrate, a vinyl sheet substrate and a polycarbonate sheet substrate at a wet film thickness of about 2 mil. and allowed to dry to remove solvents. The dry film thickness was about 0.4 mil. and was dust-free. The dried coatings were then irradiated with high intensity UV light for 3 seconds in air to effect curing. Curing could be conducted hours after deposition of the composition without air inhibition of cure.

Each coated sheet was then subjected to a surface endurance test (BTL Balanced Beam Mar Test-ASTM Method D-2197). In this test each sample was placed on a movable horizontal plastic plate beneath a stationary metal stylus pivoted at an angle of 45° with respect to the plate. The stylus carried a horizontal platform on which were placed weights of different magnitudes. The weights used in this test were 50 gms., 100 gms., 150 gms. and 200 gms. After each weight was placed on the platform, the plate and sample were moved horizontally under the stylus and the visual condition of the sample observed thereafter.

Table 3 summarizes the results of the test.

TABLE 3

| SAMPLE | PLATFORM WEIGHT (GMS.) | | | |
|---|---|---|---|---|
| | 50 | 100 | 150 | 200 |
| COATED ACRYLIC SHEET | No effect | No effect | No effect | No effect |
| COATED VINYL SHEET | No effect | No effect | No effect | No effect |
| COATED POLY-CARBONATE SHEET | No effect | No effect | No effect | No effect |
| UNCAOTED VINYL | Fineline | Line | Heavy Line | Gouge |

As the table shows all coated substrates were completely resistant to scratching by the stylus, under all loads. The uncoated vinyl sheet developed scratches under the lowest load and the intensity of scratching increased with increasing loads.

EXAMPLE 5

In this Example, the procedure of Example 1 was followed except that the stock solution of cellulose acetate butyrate was eliminated and the curable composition formed after removal of solvents essentially comprised pentaerythritol tetraacrylate and the photoinitiator. After removal of solvents the coating was wet, tacky and easily picked up dust. After irradiating the composition with UV light about 5 sec. in air the coating was hard and brittle and it was found that stroking the coating with steel wool only a few times produced abrasion. This was attributed to air inhibition of the polyacrylate cure which inhibition is substantially eliminated by the use of cellulose acetate butyrate as demonstrated in the foregoing Examples.

EXAMPLE 6

In this Example, the procedure of Example 1 was followed except that nitrocellulose was substituted for cellulose acetate butyrate as the cellulose ester. The sprayable solution was formed using this procedure was applied to an acrylic substrate instead of the polyvinyl chloride substrate of Example 1. The resulting cured coating was subjected to the steel wool abrasion test as set forth in Example 2. It was found that after 6 double rubs with the steel wool pad faint lines began to appear on the coating thus indicating that the nitrocellulose-containing coating, although abrasion resistant, is less abrasion resistant than the other samples tested in Ex. 2.

EXAMPLE 7

This Example demonstrates the resistance of the Example 1 coating to boiling water, organic solvents, acids and alkalis. For the boiling water and alcoholic potassium hydroxide tests, a sample of the Ex. 1 product was immersed in each reagent for ten minutes and the condition of the coating and substrate was observed for visual change. In the remaining tests the reagents were maintained on the product in a wet condition for ten minutes and examined for visual change. The remaining reagents were THF (tetrahydrofuran) which is a good solvent for PVC, MDC (methylene dichloride) a paint remover solvent, 50% hydrofluoric acid known for its glass etching properties, 10% sodium hydroxide, 40% sulfuric acid, 70% nitric acid, an aromatic solvent mixture, ie. benzene, toluene and xylene, alcohol, esters and ketones, and gasoline and nitromethene. Table 4 summarizes the results.

TABLE 4

| REAGENT | VISUAL CHANGE IN PRODUCT |
|---|---|
| Boiling Water | Coating unaffected; Substrate crazed |
| Boiling 10% Alcoholic Potassium Hydroxide | No change |
| THF | No change |
| MDC | No change |
| 50% Hydrofluoric Acid | No change |
| 10% Sodium hydroxide | No change |
| 40% Sulfuric Acid | No change |
| 70% Nitric Acid | No change |
| Aromatic Solvents | No change |
| Alcohol | No change |
| Esters and Ketones | No change |
| Gasoline and Nitromethane | No change |

EXAMPLE 8

In this Example, Taber Abrasion tests as described in Example 3 were conducted to compare the substrates coated in accordance with the procedure of Example 1 ie., an acrylic, polycarbonate, rigid PVC and polyester substrate, with several uncoated substrates and substrates coated with other compositions. The uncoated substrates included a polycarbonate substrate sold under the trademark CR-39 (PPG-Industries, Inc.) having abrasion resistant properties. The abrasive wheels used (CS-10F) were of a more abrasive type than those used in Example 3 and weighed 500 gms. each. The change in visual appearance in the example after 100 cycles was measured as percent increase in haze, according to ASTM D-1003. "Measurement of Haze and Luminance Transmittance of Transparent Plastics" using a Gardner Haze meter. Table 5 summarizes the results.

TABLE 5

| SAMPLE | PERCENT INCREASE IN HAZE |
|---|---|
| Ex. 1 coating on acrylic, polycarbonate, rigid PVC and polyester substrate | 1 |
| Untreated Polycarbonate (CR-99, PPG Ind., Inc.) | 2.0 |
| Acrylic coated with aliphatic urethane | 20.4 |

TABLE 5-continued

| SAMPLE | PERCENT INCREASE IN HAZE |
|---|---|
| Rigid PVC coated with melamine composition | 31.7 |
| Untreated rigid PVC | 32.7 |
| Untreated polyester | 37.3 |
| Untreated polycarbonate | 39.1 |
| Untreated acrylic | 49.2 |
| Untreated cast polyester | 66.3 |

As Table 5 shows, the substrate coated with the Example 1 coating were from about 2 to 67 times more abrasion resistant than the comparison samples.

EXAMPLE 9

In this Example, the sprayable composition of Example 1 was sprayed on an acrylic substrate, dried to remove solvents and irradiated with UV light to effect crosslinking according to Example 1. The dry film thickness of the cured coating was about 0.4 mil. The cured, coated acrylic substrate was post-cured by heating it in an oven at 150° F. for about 4 hours. The post-cured coated substrate was then subjected to the steel wool abrasion test of Example 2 using a more abrasive steel wool grade, #1 steel wool. After approximately 1000 double rubs there were no visible scratches on the coating, thus demonstrating that post-curing at elevated temperatures increases the abrasion resistance of cured coatings according to this invention.

EXAMPLE 10 AND 11

In these Examples, the procedure of Example 1 was repeated except that in the coating formulation the weight ratio of pentaerythritol tetraacrylate to cellulose acetate butyrate was changed from 10 to 1 to 100 to 1 (Ex. 10) and to 6 to 1 (Ex. 11).

On testing for resistance to steel wool abrasion according to the procedure of Example 2 it was found that both the Example 10 and 11 coatings on a polyvinyl chloride substrate endured about 20 double rubs without developing visible scratches which indicated that significant abrasion resistance of cured coatings according to the invention was still provided at the above ratios.

EXAMPLE 12

In this Example, the procedure of Example 1 was followed using di-pentaerythritol pentaacrylate instead of pentaerythritol tetraacrylate. The cured coating on a polyvinyl chloride substrate was tested for steel wool abrasion in accordance with the procedure of Example 2. The results were substantially the same in respect to abrasion resistance as the Ex. 1 coating.

EXAMPLE 13

In the Example, the procedure of Example 1 was followed using benzoyl peroxide as a photoinitiator instead of alphachloroacetyldiphenyloxide at a level of 1 weight percent based on the weight of pentaerythritol tetraacrylate. The composition was coated and cured on an acrylic substrate at a dry film thickness of about 0.3 mil. Steel wool abrasion resistance according to the procedure of Example 2 was as good as the Ex. 1 coating.

EXAMPLE 14

In this Example, the procedure of Example 1 was followed except that pentaerythritol tetramethacrylate was substituted for pentaerythritol tetraacrylate and about 150 p.b.w. of xylol was additionally used in preparing the coating formulation. About 1% benzoyl peroxide based on the weight of pentaerythritol tetramethacrylate was added as a co-photoinitiator with the alpha-chloroacetyldiphenyloxide. The sprayable solution was sprayed on a polyvinyl chloride substrate at a wet-film thickness of about 0.9 mil. After removal of solvents the dry film thickness was about 0.3 mil. The cure time was about 15 sec. using high intensity UV light.

It was found that rubbing the coated surface with a #0000 steel wool pad according to the procedure of Example 2, produced no scratches after 100 double rubs.

I claim:

1. A composition curable by actinic radiation to form an abrasion-resistant optical product consisting essentially of a pentaerythritol based polyacrylate selected from the group consisting of a pentaerythritol polyacrylate, a pentaerythritol polymethacrylate, a dipentaerythritol polyacrylate, a dipentaerythritol polymethacrylate, a tripentaerythritol polyacrylate and a tripentaerythritol polymethacrylate, a cellulose ester comprising the reaction product of cellulose with at least one organic carboxylic acid having from about 2 to 4 carbon atoms or nitric acid and a photoinitiator, wherein the weight ratio of said polyacrylate to said ester is from about 6 to 1 to about 100 to 1.

2. The composition of claim 1 wherein said pentaerythritol polyacrylate is selected from the group consisting of pentaerythritol triacrylate, pentaerythritol tetraacrylate, dipentaerythritol hexaacrylate, dipentaerythritol pentaacrylate, tripentaerythritol octaacrylate and mixtures thereof.

3. The composition of claim 1 wherein said pentaerythritol polyacrylate is pentaerythritol tetraacrylate.

4. The composition of claim 1 wherein said dipentaerythritol polyacrylate is dipentaerythritol pentaacrylate.

5. The composition of claim 1 wherein said pentaerythritol polymethacrylate is selected from the group consisting of pentaerythritol trimethacrylate, pentaerythritol tetramethacrylate, dipentaerythritol hexamethacrylate, dipentaerythritol pentamethacrylate, tripentaerythritol octamethacrylate and mixtures thereof.

6. The composition of claim 1 wherein said pentaerythritol polymethacrylate is pentaerythritol tetramethacrylate.

7. The composition of claim 1 wherein said cellulose ester is cellulose acetate butyrate.

8. The composition of claim 7 wherein said cellulose acetate butyrate contains on the average from about 15% to 50% butyryl groups, from about 1% to 30% acetyl groups and from about 1% to 5% hydroxyl groups.

9. The composition of claim 8 wherein said cellulose acetate butyrate has a viscosity in Poises of from about 50 to 200 at 25° C. in a solution comprising 20 wt. % cellulose acetate butyrate, 72 wt. % acetone and 8 wt. % ethyl alcohol.

10. The composition of claim 1 wherein said photoinitiator is alphachloroacetyldiphenyloxide.

11. The composition of claim 1 wherein said photoinitiator is benzoyl peroxide.

12. The composition of claim 1 which further comprises at least one solvent selected from the group consisting of lower alcohols, lower alkyl acetates, alkyl ketones having from 3 to 7 carbon atoms and ethylene glycol lower alkyl ethers.

13. A composition curable by actinic radiation to form an abrasion resistant optical product comprising a pentaerythritol based polyacrylate selected from the group consisting of a pentaerythritol polyacrylate, a pentaerythritol polymethacrylate, a dipentaerythritol polyacrylate, a dipentaerythritol polymethacrylate, a tripentaerythritol polyacrylate and a tripentaerythritol polymethacrylate, a cellulose acetate butyrate containing on the average from about 13% to 50% butyryl groups, from about 1% to 30% acetyl groups and from about 1% to 5% hydroxyl groups and a photoinitiator, wherein the weight ratio of said polyacrylate to said butyrate is from about 6 to 1 to about 100 to 1.

14. The composition of claim 13 wherein said cellulose acetate butyrate has a viscosity in Poises of from about 50 to 200 at 25° C. in a solution comprising 20 wt. % cellulose acetate butyrate, 72 wt. % acetone and 8 wt. % ethyl alcohol.

15. The composition of claim 13 wherein said cellulose acetate butyrate contains on the average 37% butyryl groups, 13% acetyl groups and 2% hydroxyl groups and has a viscosity in Poises of from about 64 to 124 at 25° C. in a solution comprising 20 wt. % cellulose ester, 72 wt. % acetone and 8 wt. % ethyl alcohol.

16. The composition of claim 13 wherein said photoinitiator is alpha chloroacetyldiphenyloxide.

17. The composition of claim 13 wherein said photoinitiator is benzoyl peroxide.

18. The composition of claim 13 which further comprises at least one solvent selected from the group consisting of lower alcohols, lower alkyl acetates, alkyl ketones having from 3 to 7 carbon atoms and ethylene glycol lower alkyl ethers.

19. The composition of claim 13 wherein said weight ratio is from about 8 to 1 to about 20 to 1.

20. The composition of claim 13 wherein said weight ratio is about 10:1.

21. The composition of claim 13 wherein said pentaerythritol polyacrylate is pentaerythritol tetraacrylate.

22. The composition of claim 13 wherein said dipentaerythritol polyacrylate is dipentaerythritol tetraacrylate.

23. The composition of claim 13 wherein said dipentaerythritol polymethacrylate is dipentaerythritol tetramethacrylate.

24. A composition curable by actinic radiation to form an abrasion resistant optical product comprising pentaerythritol tetraacrylate, a cellulose acetate butyrate containing on the average 37% butyryl groups, 13% acetyl groups and 2% hydroxyl groups and having a viscosity in Poises of from 64 to 124 at 25° C. in a solution comprising 20 wt. % cellulose ester, 72 wt. % acetone and 8 wt. % ethyl alcohol and a photoinitiator wherein the weight ratio of said tetraacrylate to said cellulose acetate butyrate is from about 6 to 1 to 100 to 1.

25. A product comprising the cured composition of claim 1.

26. A product comprising the cured composition of claim 3.

27. A product comprising the cured composition of claim 8.

28. A product comprising the cured composition of claim 13.

29. A product comprising the cured composition of claim 14.

30. A product comprising the cured composition of claim 15.

31. A product comprising the cured composition of claim 21.

32. A product comprising the cured composition of claim 24.

33. An abrasion-resistant product comprising a substrate having coated thereon the cured composition of claim 1.

34. An abrasion resistant product comprising a substrate having coated thereon the cured composition of claim 13.

35. An abrasion resistant product comprising a substrate having coated thereon the cured composition of claim 24.

36. A product comprising a substrate having coated thereon the composition of claim 1.

37. A product comprising a substrate having coated thereon the composition of claim 3.

38. A product comprising a substrate having coated thereon the composition of claim 8.

39. A product comprising a substrate having coated thereon the composition of claim 13.

40. A product comprising a substrate having coated thereon the composition of claim 14.

41. A product comprising a substrate having coated thereon the composition of claim 15.

42. A product comprising a substrate having coated thereon the composition of claim 21.

43. A product comprising a substrate having coated thereon the composition of claim 24.

* * * * *

UNITED STATES PATENT AND TRADEMARK OFFICE
CERTIFICATE OF CORRECTION

PATENT NO. : 4,308,119

DATED : December 29, 1981

INVENTOR(S) : Rsymond J. Russell

It is certified that error appears in the above—identified patent and that said Letters Patent is hereby corrected as shown below:

Column 13, line 12 (claim 13), "13%" should read -- 15% --.

Signed and Sealed this

Twenty-seventh Day of April 1982

|SEAL|

Attest:

Attesting Officer

GERALD J. MOSSINGHOFF

Commissioner of Patents and Trademarks